(12) United States Patent
Li et al.

(10) Patent No.: US 12,416,795 B2
(45) Date of Patent: Sep. 16, 2025

(54) LIGHT SHIELDING DEVICE FOR MICROSCOPE AND MICROSCOPE COMPRISING THE SAME

(71) Applicant: CARL ZEISS MICROSCOPY GMBH, Jena (DE)

(72) Inventors: Jing Li, Shanghai (CN); Fang Dong, Shanghai (CN); Junjie Cao, Shanghai (CN); Xingbiao Gu, Shanghai (CN); Shukuan Xu, Shanghai (CN)

(73) Assignee: Carl Zeiss Microscopy GMBH, Jena (DE)

( * ) Notice: Subject to any disclaimer, the term of this patent is extended or adjusted under 35 U.S.C. 154(b) by 918 days.

(21) Appl. No.: 17/383,692

(22) Filed: Jul. 23, 2021

(65) Prior Publication Data

US 2021/0349297 A1    Nov. 11, 2021

Related U.S. Application Data

(63) Continuation of application No. 17/221,504, filed on Apr. 2, 2021, now abandoned.

(30) Foreign Application Priority Data

Apr. 3, 2020  (CN) .......................... 202010260711.8

(51) Int. Cl.
*G02B 5/20*    (2006.01)
*G02B 21/00*   (2006.01)
(Continued)

(52) U.S. Cl.
CPC ............. *G02B 21/24* (2013.01); *G02B 5/205* (2013.01); *G02B 21/12* (2013.01); *G02B 21/16* (2013.01)

(58) Field of Classification Search
CPC .......................... G02B 21/00; G02B 21/0004; G02B 21/0008; G02B 21/0012; G02B 21/0028;
(Continued)

(56) References Cited

U.S. PATENT DOCUMENTS 5,168,491 A * 12/1992 Akatsuka ............... G11B 19/02
5,239,171 A    8/1993 Takabayashi et al.
(Continued)

FOREIGN PATENT DOCUMENTS

CN    202631840 U  * 12/2012
CN    105589189 A    5/2016
(Continued)

*Primary Examiner* — Thong Q Nguyen
(74) *Attorney, Agent, or Firm* — Armstrong Teasdale LLP (57) ABSTRACT

The disclosure relates to a light shielding device for a microscope and a microscope including the same. In the microscope, transmitting illumination light from a transmitting illumination light source is irradiated from above a stage to a specimen on the stage and fluorescent illumination light from a fluorescent illumination light source is irradiated from below the stage to the specimen on the stage. The light shielding device may be mounted to a lower end portion of a condenser of the microscope to at least partially block ambient light entering an objective of the microscope. The light shielding device may include a light shield and a mounting mechanism configured to mount the light shield below the lower end portion of the condenser in a manually removable manner, and/or the light shield includes a through hole and a light shielding portion surrounding the through hole.

21 Claims, 5 Drawing Sheets

(51) Int. Cl.
*G02B 21/12* (2006.01)
*G02B 21/16* (2006.01)
*G02B 21/24* (2006.01)

(58) Field of Classification Search
CPC ............ G02B 21/0032; G02B 21/0076; G02B 21/0088; G02B 21/02; G02B 21/06; G02B 21/08; G02B 21/082; G02B 21/084; G02B 21/088; G02B 21/10; G02B 21/12; G02B 21/125; G02B 21/16; G02B 21/24; G02B 5/00; G02B 5/20; G02B 5/205
USPC .................................................. 359/368–390
See application file for complete search history.

(56) References Cited

U.S. PATENT DOCUMENTS

| | | | | |
|---|---|---|---|---|
| 6,876,503 B1 * | 4/2005 | Weaver | ............... | G02B 21/0012 359/818 |
| 9,019,600 B2 * | 4/2015 | Hirano | ................... | G02B 21/24 359/383 |
| 10,168,518 B2 * | 1/2019 | Amano | ................. | G02B 21/08 |
| 10,222,598 B2 * | 3/2019 | Kitahara | ................ | G02B 21/16 |
| 2001/0003489 A1 | 6/2001 | Shiba et al. | | |
| 2007/0153372 A1 | 7/2007 | Mazel | | |
| 2013/0027770 A1 | 1/2013 | Ganser et al. | | |
| 2017/0090173 A1 | 3/2017 | Kitahara et al. | | |
| 2017/0285315 A1 | 10/2017 | Amano et al. | | |

FOREIGN PATENT DOCUMENTS

| | | | |
|---|---|---|---|
| CN | 208672904 | * | 3/2019 |
| CN | 109581645 A | | 4/2019 |
| CN | 113504636 A | | 10/2021 |
| DE | 102010053475 A1 | | 6/2012 |
| EP | 0978008 A2 | | 2/2000 |
| EP | 1403675 A2 | | 3/2004 |
| EP | 2669728 A1 | | 12/2013 |
| JP | H0647917 U | | 6/1994 |
| JP | 2005189398 A | | 7/2005 |
| JP | 2006081842 A | | 3/2006 |
| JP | 2009-98230 | * | 5/2009 |
| JP | 2009-109787 | * | 5/2009 |
| JP | 2009288528 A | | 12/2009 |
| JP | 2013134491 A | | 7/2013 |
| WO | 1995030919 A1 | | 11/1995 |
| WO | 2017086287 A1 | | 5/2017 |

* cited by examiner

LIGHT SHIELDING DEVICE FOR MICROSCOPE AND MICROSCOPE COMPRISING THE SAME

CROSS REFERENCE TO RELATED APPLICATIONS

This patent application is a continuation of U.S. patent application Ser. No. 17/221,504 filed on Apr. 2, 2021, now abandoned, which claims the benefit and priority of Chinese Patent Application No. 202010260711.8 filed on Apr. 3, 2020, the disclosures of which are incorporated by reference herein in their entirety as part of the present application.

TECHNICAL FIELD

The invention relates to the field of microscope, in particular to a microscope with a fluorescence observation function, and more particularly to a light shielding device used for such a microscope.

BACKGROUND ART

Fluorescence microscopes or microscopes with a fluorescence observation function are known in the art. In this type of microscope, a specimen located on a stage of the microscope is irradiated with excitation light from a specified light source when fluorescence observation is performed. The fluorescent substance contained in the specimen is excited by the excitation light to emit fluorescence having a longer wavelength than that of the excitation light, so a fluorescent image of the specimen can be observed through an objective and others of the microscope.

However, the fluorescence is weak light, so if ambient light other than the fluorescence emitted by the specimen also enters the objective of the microscope (in particular, it is easier to receive ambient light when the objective is arranged below the stage), it will mix with the fluorescence and interfere with the fluorescent image of the specimen, making it difficult to obtain a clear fluorescent image with sufficient contrast.

In this regard, it has been proposed in the prior art to equip the microscope with a light shielding device to minimize the ambient light that enters the objective during fluorescence observation of the microscope, so that the contrast of the fluorescent image of the specimen can be improved without needing to operate the microscope in a dark environment. However, the existing light shielding devices still have room for improvement in terms of convenience in use and installation.

The invention aims to overcome one or more defects and/or other problems existing in the prior art.

SUMMARY OF THE INVENTION

In a first aspect, the invention relates to a light shielding device for a microscope, the microscope comprising a condenser configured so that transmitting illumination light from a transmitting illumination light source is irradiated from above a stage to a specimen on the stage via the condenser; wherein fluorescent illumination light from a fluorescent illumination light source is irradiated from below the stage to the specimen on the stage; wherein the light shielding device is mounted to a lower end portion of the condenser to at least partially block ambient light entering an objective of the microscope, and wherein the light shielding device comprises a light shield and a mounting mechanism configured to mount the light shield below the lower end portion of the condenser in a manually removable manner.

In a second aspect, the invention relates to a microscope, comprising: a condenser configured so that transmitting illumination light from a transmitting illumination light source is irradiated from above a stage to a specimen on the stage via the condenser, wherein fluorescent illumination light from a fluorescent illumination light source is irradiated from below the stage to the specimen on the stage; and a light shielding device according to the first aspect.

In a third aspect, the invention relates to a light shielding device for a microscope in which transmitting illumination light from a transmitting illumination light source is irradiated from above a stage to a specimen on the stage and fluorescent illumination light from a fluorescent illumination light source is irradiated from below the stage to the specimen on the stage; wherein the light shielding device comprises a light shield disposed above the specimen on the stage to at least partially block ambient light entering an objective of the microscope, and wherein the light shield comprises a through hole and a light shielding portion surrounding the through hole, the through hole being configured to allow all or part of the transmitting illumination light to pass through the light shield, and a light shield filter is provided at the through hole.

In a fourth aspect, the invention relates to a microscope, in which transmitting illumination light from a transmitting illumination light source is irradiated from above a stage to a specimen on the stage and fluorescent illumination light from a fluorescent illumination light source is irradiated from below the stage to the specimen on the stage, and which comprises a light shielding device according to the third aspect.

In a fifth aspect, the invention relates to a microscope, in which transmitting illumination light from a transmitting illumination light source is irradiated from above a stage to a specimen on the stage and fluorescent illumination light from a fluorescent illumination light source is irradiated from below the stage to the specimen on the stage, and which comprises: a light shielding device disposed above and the specimen on the stage to at least partially block ambient light entering an objective of the microscope; and an illumination light path filter disposed in a light path between the transmitting illumination light source and the specimen on the stage.

The light shielding device for a microscope according to the invention may be mounted to e.g. a lower end portion of the condenser of the microscope to at least partially block ambient light entering the objective, and the light shielding device comprises a light shield and a mounting mechanism configured to mount the light shield below the lower end portion of the condenser in a manually removable manner. In this way, when the microscope is used for fluorescence observation, the light shield featuring a simple structure and easy installation can effectively block the ambient light that would otherwise enter the objective of the microscope, thereby ensuring the contrast and definition of the fluorescent image of the microscope. Moreover, when the microscope is not used for fluorescence observation, the light shield can be quickly and easily removed so as not to hinder other operations (e.g. bright-field observation performed using a transmitting illumination light source) of the microscope. This simplifies the structure of the light shielding device and improves its convenience of use. In addition, according to the invention, a filter, in particular a neutral density filter, may be provided between the transmitting illumination light source and the specimen on the stage of the microscope and/or provided at the light shield. This can not only effectively prevent various ambient light from interfering with the fluorescent image, but also achieve other observation operations and functions of the microscope even without removing the light shield, which greatly improves the practicality and functionality of the microscope.

BRIEF DESCRIPTION OF THE DRAWINGS

The above and other advantages, features, and details of the invention can be derived from the exemplary embodiments described below with reference to the drawings, in which.

DETAILED DESCRIPTION OF THE EMBODIMENTS

Figure 1:
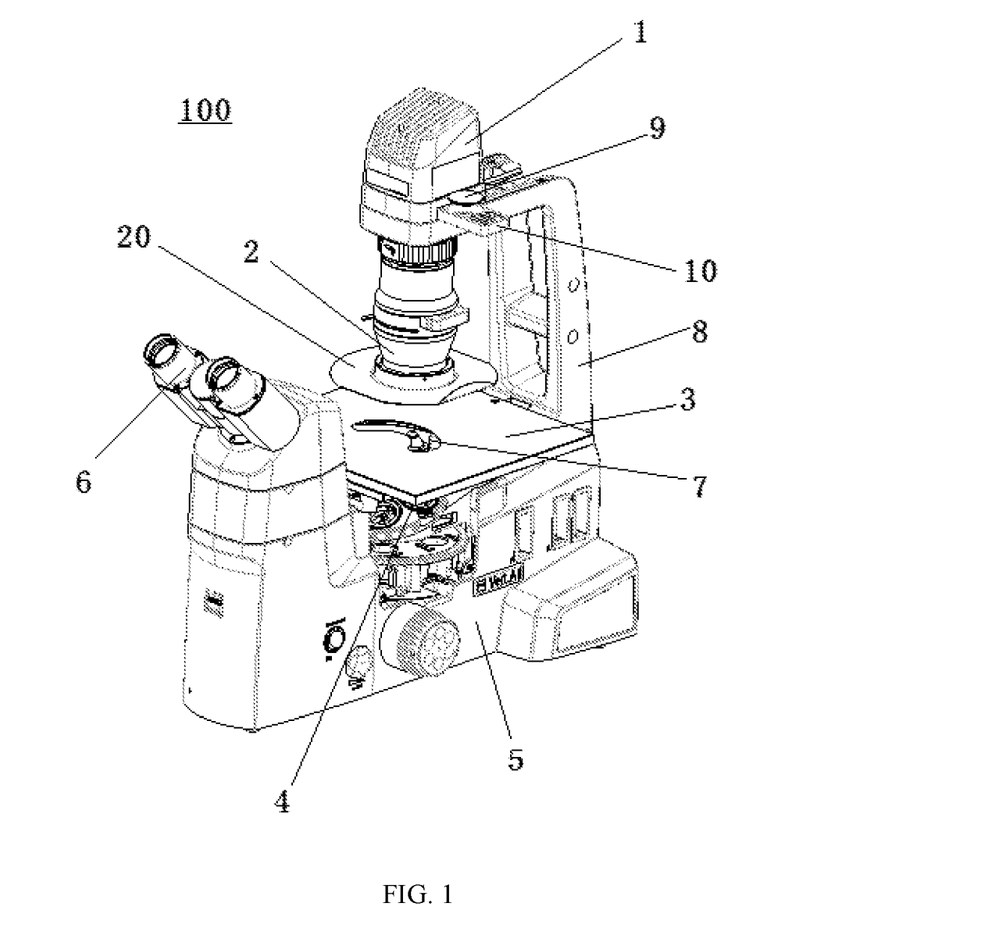
FIG. 1 is a perspective view of an exemplary configuration of a microscope according to the invention.

FIG. 1 shows an exemplary microscope 100 according to the invention, including some common components such as a base 5, an arm 8, a condenser 2, a stage 3, an objective 4, an eyepiece unit 6 and a set of intermediate imaging lenses (not shown). The microscope 100 may be, for example, a so-called inverted microscope, wherein a plurality of objectives 4 having different magnifications and mounted on an objective turret are arranged below the stage 3, and the objective turret may be rotated to align a selected objective 4 with an aperture 7 in the stage 3 as needed, in order to observe a specimen (not shown) placed above the aperture 7 on the stage 3. The condenser 2 is, for example, cylindrical as a whole and is mounted vertically at a tip end of the arm 8. The condenser 2 is configured such that transmitting illumination light (for example, white light) from a transmitting illumination light source 1 (for example, including a light emitting diode, which is generally a white light LED) is collected by the condenser 2 (more specifically, converged by one or more condenser lenses included in the condenser 2), then is irradiated from above the stage 3 to the specimen on the stage, and thereafter enters the objective 4 through the specimen, thereby producing a bright field image to enable bright field observation. In the illustrated embodiment, the transmitting illumination light source 1 is also mounted to the arm 8, but the transmitting illumination light source may be an external light source provided outside the microscope. The microscope 100 also has a fluorescence observation function. To this end, the microscope 100 further includes a fluorescent illumination light source (not shown, generally multi-channel monochromatic LEDs) that can be built inside or outside the base 5 of the microscope. Certain monochromatic illumination light emitted from the fluorescent illumination light source becomes excitation light (for example, ultraviolet light) after passing through an excitation filter, and then is irradiated from below the stage 3 through the objective 4 to the specimen on the stage, thereby exciting the fluorescent substance contained in the specimen to emit fluorescence. After the fluorescence is reflected by the specimen, it travels downward to enter the objective 4, and finally into the eyepiece unit 6 through the set of intermediate imaging lenses. In this way, fluorescence observation is realized and a fluorescent image of the specimen can be observed.

In the fluorescence observation mode of the microscope 100, in order to prevent ambient light from entering the objective 4 and mixing with the fluorescence emitted from the specimen to reduce the contrast of the fluorescent image, a light shielding device 20 is mounted between the transmitting illumination light source 1 and the specimen on the stage, e.g. to an lower end portion of the condenser 2 to at least partially block the ambient light that would otherwise enter the objective 4. Thus fluorescence observation can be performed with the microscope 100 even if it is not in a dark environment.

According to an embodiment of the invention, the light shielding device 20 comprises a light shield 21 and a mounting mechanism configured to mount the light shield below the lower end portion of the condenser 2 in a manually removable manner. Herein, "mount . . . in a manually removable manner" means that the light shield can be easily and quickly attached to and detached from the condenser 2 by hand without using a tool. FIGS. 2 to 5 show several exemplary configurations of the mounting mechanism.

Figure 2:
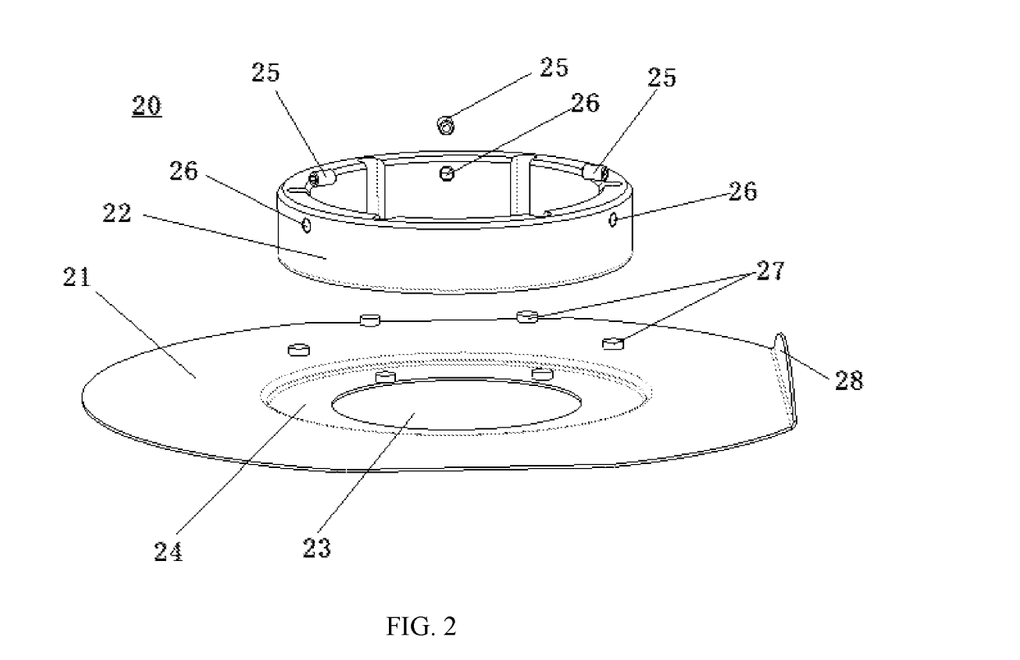
FIG. 2 shows a first embodiment of the light shielding device for a microscope according to the invention.

In the embodiment shown in FIG. 2, the mounting mechanism includes a collar 22 mounted around the lower end portion of the condenser 2. To this end, the collar 22 may be in the form of, for example, a circular ring corresponding to the circular cross section of the condenser 2. A plurality of threaded holes 26 (e.g. three are illustrated in the figure), which are preferably evenly spaced apart from each other, may be provided circumferentially in the collar 22, and a lock screw 25 is fitted in each of the threaded holes 26. By screwing the lock screws 25 radially inward into the corresponding threaded holes 26, the tip end of each lock screw 25 is abutted against the outer circumferential surface of the condenser 2, thereby fixing the collar 22 to the lower end portion of the condenser 2. The vertical position of the collar 22 may be adjusted by loosening each lock screw 25, then moving the collar 22 upward or downward to a desired new position, and then tightening each lock screw. It may be understood by those skilled in the art that the manner of mounting the collar 22 to the lower end portion of the condenser 2 is not limited to use of the above-mentioned lock screws 25; instead, various ways of connecting, such as adhesive bonding, threaded connection (by providing matching threads on the outer circumferential surface of the condenser 2 and the inner circumferential surface of the collar 22), and form-fit connection (e.g. snap-fit) may be adopted as appropriate. The collar 22 may also be configured to be integrally formed with the casing of the condenser 2 at the lower end portion of the condenser 2.

One or more magnets 27 are fixed to the lower end surface of the collar 22 by e.g. adhesive bonding, and the light shield 21 may be made at least partially by a ferromagnetic material. Thus, the light shield 21 can be conveniently attached to the collar 22 by the magnetic attractive force with the magnets 27, and can be removed easily and quickly from the collar 22 by only overcoming the magnetic attractive force by hand. In order to facilitate the disassembly and assembly of the light shield 21 by hand. A bending portion 28 for hand grasping may be provided at the peripheral edge of the light shield 21. In the illustrated embodiment, six magnets 27 are evenly distributed in the circumferential direction, but the invention is obviously not limited to this. The number of the magnets 27 may vary depending on the weight of the light shield 21 and the applied force desired to detach the light shield 21. In addition, in order to quickly and accurately mount the light shield 21 in place to achieve a good light shielding effect, a depression 24 may be provided in the upper surface of the light shield 21. When the light shield 21 is attached to the collar 22, the lower end portion of the collar 22 is received in the depression 24 in such a manner that the depression 24 can define the position of the light shield 21 relative to the collar 22 through the engagement between the inner side wall of the depression 24 and the outer circumferential wall of the lower end portion of the collar 22.

The height of the light shield 21 or the distance between it and the stage 3 may be set by adjusting the vertical position of the collar 22 on the condenser 2 and/or by adjusting the axial length (i.e. width in vertical direction shown in FIG. 2) of the collar 22. A desired light shielding effect can be achieved by appropriately setting the height and/or size of the light shield 21 according to the space arrangement requirements in the microscope 100. The light shield 21 may be a solid thin plate, but may also be configured as a closed plate including a through hole 23 and a light shielding portion surrounding the through hole 23 as shown in FIG. 2. The through hole 23 is positioned, sized and shaped to allow all or part of the transmitting illumination light from the condenser 2 to pass through the light shield 21. During fluorescence observation, since the edge of the through hole 23 in the light shield 21 may be arranged e.g. in close proximity to the lower end portion of the condenser 2, no ambient light is allowed to pass downward through the through hole 23, while other ambient light can still be blocked by the light shielding portion surrounding the through hole 23. When it is switched from the fluorescence observation mode to the bright field observation mode performed using the transmitting illumination light source 1, the transmitting illumination light can still be radiated downward from the condenser 2 through the through hole 23 without being blocked by the light shield 21. That is, the microscope can be switched from the fluorescence observation mode using the fluorescent illumination light source to the bright field observation using the transmitting illumination light source 1, without removing the light shield 21, which improves the use convenience of the microscope 100.

In the case where the light shield 21 is provided with the through hole 23, during fluorescence observation, the excitation light that is irradiated upward to the specimen on the stage through the objective 4 will pass through the normally translucent specimen and continue to travel upward to the LED fluorescent powder in the transmitting illumination light source, which will be excited to generate auto-fluorescence. The auto-fluorescence can be irradiated downward and enter the objective 4, thereby disturbing the fluorescent image of the specimen. In order to reduce the adverse effect of the auto-fluorescence, the microscope 100 according to the invention may be provided with a filter (hereinafter referred to as "illumination light path filter") in a light path between the transmitting illumination light source and the specimen on the stage. For example, an illumination light path filter 9 may be arranged in a light path between the transmitting illumination light source 1 and the condenser 2, as shown in FIG. 1. More specifically, the illumination light path filter 9 may be disposed e.g. at a light outlet of the transmitting illumination light source 1. The illumination light path filter 9 may be received, for example, in a slider 10 and inserted between the light source 1 and the condenser 2 by way of the slider 10.

Such an illumination light path filter can selectively reduce transmission ratio of certain spectrum range, and may be any one of a neutral density filter, a color filter, a bandpass filter, a notch filter, a long pass filter, a spectral filter and a multivariate optical element that can tune transmission at different wavelengths.

Preferably, the illumination light path filter has different transmissions for light of different wavelengths to match with emission spectral intensity of the transmitting illumination light source. Transmission of the illumination light path filter may be inversely proportional to the emission spectral intensity of the transmitting illumination light source. Transmission of the illumination light path filter may be lower for a wavelength with a higher emission spectral intensity, and higher for a wavelength with a lower emission spectral intensity. The maximum transmission may be not higher than 2%, while the minimum transmission may be not lower than 1%.

In view of the fact that visual observation requires light of different wavelengths is tuned at the same ratio after passing through the filter in order to avoid color cast, the illumination light path filter 9 is preferably a neutral density filter. The neutral density filter 9 can attenuate light of different wavelengths passing therethrough in the same proportion/ratio, and thus the excitation light radiated upward through the specimen will be attenuated by the neutral density filter 9, so the auto-fluorescence excited by the attenuated excitation light in the LED of the transmitting illumination light source will be reduced. The auto-fluorescence will be attenuated again by the neutral density filter 9 when it is irradiated downward. Eventually, little or no auto-fluorescence enters the objective 4, thereby helping to improve the contrast of the fluorescent image. In addition to this advantage, the neutral density filter 9 also enables normal use of phase contrast, differential interference contrast (DIC), plastic differential interference contrast (Plas-DIC) and other observation methods of the microscope under transmitting light illumination without user operations (unnecessary to remove the light shield 21), and helps to realize the function of capturing fluorescent and bright field images with one button click as well as the function of switching between fluorescence and bright field observations with one button click.

As an example, the following optical parameters may be adopted for the illumination light path filter 9 that is preferably a neutral density filter: an average reflection of not more than 4% for light with a wavelength of 420 nm to 680 nm, an average transmission of not more than 2% (corresponding to an optical density of not less than 1.7) for light with a wavelength of 350 nm to 400 nm, and an average transmission between 1.3% and 2% (corresponding to an optical density between 1.7 and 1.9) for light with a wavelength of 400 nm to 700 nm.

It is also conceivable for those skilled in the art that an opaque shield may be used in place of the illumination light path filter 9 to completely block the light path (having the same effect as the case where the light shield 21 is a solid thin plate) in consideration of cost saving etc. However, the opaque shield will block not only the upward excitation light and the downward auto-fluorescence, but also the transmitting illumination light radiated downward. Therefore, it is not possible to realize the function of capturing fluorescent and bright field images with one button click and the function of switching between fluorescence and bright field observations with one button click. If a bright field image produced by using transmitting illumination light is desired, the user needs to push away the slider 10, and in this case the convenience of use will be impaired.

Figure 3:
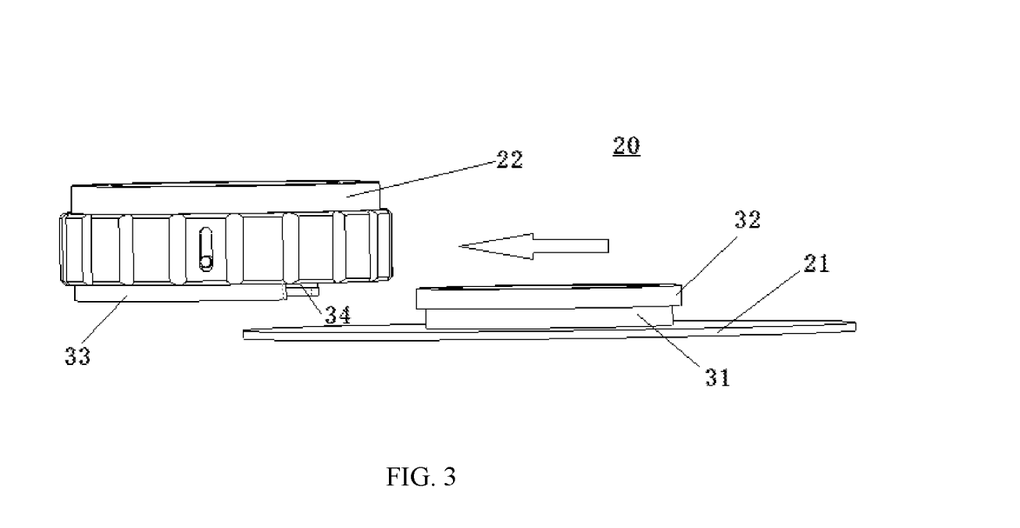
FIG. 3 shows a second embodiment of the light shielding device for a microscope according to the invention.
Figure 4:
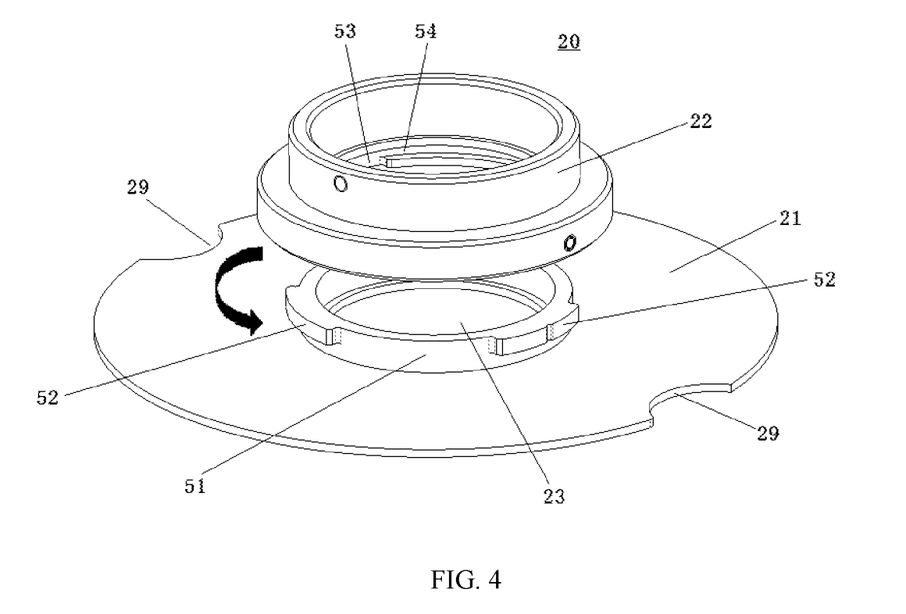
FIG. 4 shows a third embodiment of the light shielding device for a microscope according to the invention.

In the embodiments shown in FIGS. 3 and 4, the mounting mechanism still includes a collar 22 which can be mounted around the lower end portion of the condenser 2 in the same way as the collar 22 shown in FIG. 2.

However, a protrusion 33 is provided on the lower end portion of the collar 22 shown in FIG. 3. The protrusion 33 has, for example, a semicircular shape or a minor arc shape extending in the circumferential direction of the collar 22 and has an L-shaped cross section. In this way, a slot 34 having a semicircular shape or a minor arc shape as a whole is formed between the two branches of the L shape. Correspondingly, a circular boss 31 is provided on the upper surface of the light shield 21, and a circular or arc-shaped flange 32 is formed along the circumferential direction of the circular boss 31. The flange 32 is configured to be inserted and fitted into the slot 34 in a direction indicated by the blank arrow shown in FIG. 3, and thereby the light shield 21 can be conveniently mounted to the lower end portion of the collar 22. The light shield 21 can be removed easily as long as the flange 32 is simply pulled out of the slot 34 in a reverse direction. Those skilled in the art can easily understand that positions of the slot and the flange may be exchanged, that is, the slot is arranged on the light shield 21 and the flange is arranged on the collar 22. In addition, the shape of the slot and the flange is not limited to a circular shape or an arc shape, but may be, for example, a linear shape. Naturally, in the case of a linear shape, it is preferable that the slot and the flange are arranged at positions that do not block the hollow portion of the collar 22 or the opening 23 (if provided) of the light shield 21.

The upper surface of the light shield 21 shown in FIG. 4 is also provided with a circular boss 51, which is formed with a plurality of radially protruding protrusions 52 arranged at intervals in the circumferential direction (in the embodiment of FIG. 4, three evenly spaced protrusions are provided, but only two of them are shown). The lower end portion of the collar 22 shown in FIG. 4 is provided with a plurality of L-shaped grooves in one-to-one correspondence to the plurality of protrusions 52. Specifically, each L-shaped groove is composed of a first portion 53 extending vertically and a second portion 54 extending horizontally. When the light shield 21 is mounted to the collar 22, each of the protrusions 52 is first aligned with the first portion 53 of a corresponding L-shaped groove, and then the light shield 21 is moved upward so that the protrusion 52 is lifted a sufficient distance in the corresponding first portion 53. Next, the light shield 21 is rotated in the direction of the black arrow indicated in FIG. 4, so that the protrusion 52 is rotated in the horizontal plane into the second portion 54 of the corresponding L-shaped groove, and is thereby supported on a portion of the collar delimiting the second portion 54. It can be seen that a bayonet connection is thus formed between the collar 22 and the circular boss 51. Those skilled in the art can readily understand that the bayonet connection can be easily disengaged by performing the above actions in a reverse order. In addition, positions of the protrusions 52 and the L-shaped grooves may be exchanged. For example, protrusions protruding radially inward may be provided on the inner circumferential surface of the lower end portion of the collar 22, while corresponding L-shaped grooves may be provided on the outer circumferential surface of the circular boss 51. In order to facilitate disassembly, two recessed portions 29 facing each other may be provided on the outer peripheral edge of the light shield 21 to facilitate grasping by two fingers of a user hand.

Figure 5:
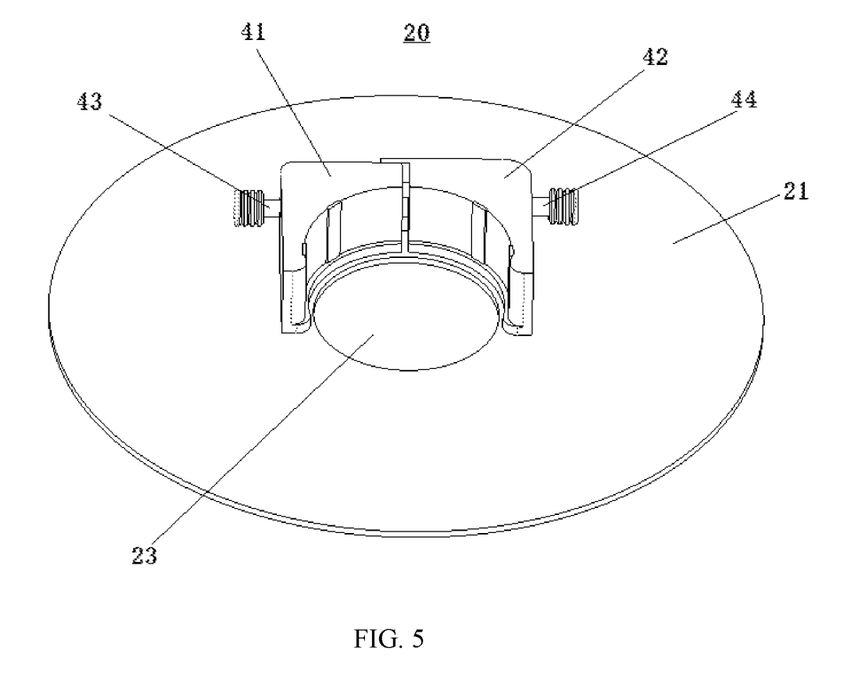
FIG. 5 shows a fourth embodiment of the light shielding device for a microscope according to the invention.

In the embodiment shown in FIG. 5, the mounting mechanism includes at least two clamping members 41 and 42 biased toward each other in e.g. a resilient manner (may be realized by e.g. a tensile spring connected therebetween, not shown) to clamp the lower end portion of the condenser 2. To this end, the radially inwardly facing surfaces of the clamping members 41, 42 may be designed as arc-shaped surfaces to match and frictionally engage the outer circumferential surface of the condenser 2. Grips 43, 44 may be provided on the clamping members 41 and 42, respectively, and both hands may grasp them to pull apart the two clamping members against the spring force. In this way, the clamping members 41 and 42 can clamp the condenser 2 and be removed from it. The light shield 21 can be fixed to the lower end surface of one of the at least two clamping members by e.g. adhesive bonding or any other suitable methods, so that it can be mounted and dismounted together with the clamping members.

In the embodiments shown in FIGS. 3 to 5, the light shield 21 may optionally include the through hole 23 as described above, so that it is unnecessary to remove the light shield 21 from the condenser 2 during bright field observation of the microscope.

Figure 6:
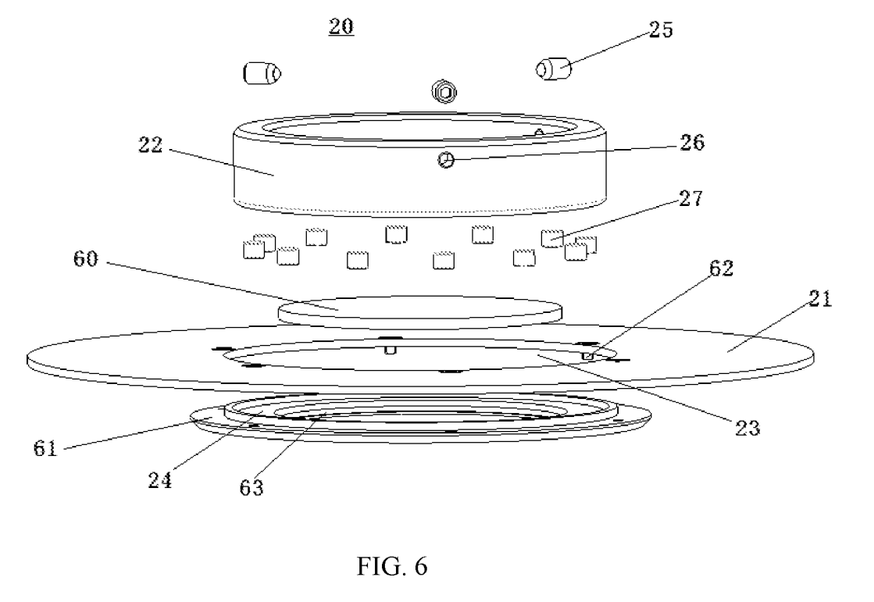
FIG. 6 shows a fifth embodiment of the light shielding device for a microscope according to the invention.

It has been described above that the illumination light path filter 9 arranged in the light path between the transmitting illumination light source 1 and the specimen on the stage is used to favorably attenuate the excitation light and auto-fluorescence passing through the through hole 23. As an alternative or additional component to the illumination light path filter 9, as shown in FIG. 6, another filter 60 (hereinafter referred to as "light shield filter") may be provided at the through hole 23 of the light shield 21 to close the through hole. The effect of the light shield filter 60 is the same as that of the illumination light path filter 9 shown in FIG. 1. The light shield filter 60 may be attached in the through-hole 23 or attached to the edge of the through-hole 23 by, for example, adhesive bonding. Alternatively, as shown in FIG. 6, a holder 61 may be provided in the through hole 23, and a depression 63 may be provided in the holder 61 to receive the light shield filter 60. The holder 61 may be fixed at the edge of the through-hole 23 through, for example, a plurality of fasteners 62, thereby the light shield filter 60 is indirectly arranged at the through-hole 23. The light shield filter 60 may have the same type and optical properties as the illumination light path filter 9 described above (for example, the filters 9 and 60 may be identical neutral density filters).

During transmitting illumination, the transmitting illumination light radiated downward will also be attenuated by the illumination light path filter 9 and/or light shield filter 60 described above. For this, the driving current of e.g. the white light LED in the transmitting illumination light source may be set to maximum the light intensity so as not to impair the bright field effect of the transmitting illumination light source. Besides, optical parameters of the filter(s) may be set by comprehensively taking account of the energy of the existing light sources and acceptable bright field effect, such that the attenuation by the filter(s) would not adversely affect the bright field effect.

A person skilled in the art can appreciate that either or both of the illumination light path filter 9 and the light shield filter 60 may be provided in the microscope system depending on the specific product design and/or application. It would also be appreciated by those skilled in the art that the terms "illumination light path filter 9" and "light shield filter 60″ as used herein are just for the purpose of differentiation between the two filters according to their respective positions in the microscope system, and both of them may be any conventional filter in the field of optical components, such as a neutral density filter, a color filter, a bandpass filter, a notch filter, a long pass filter, a spectral filter or a multivariate optical element that can tune transmission at different wavelengths.

Figure 7:
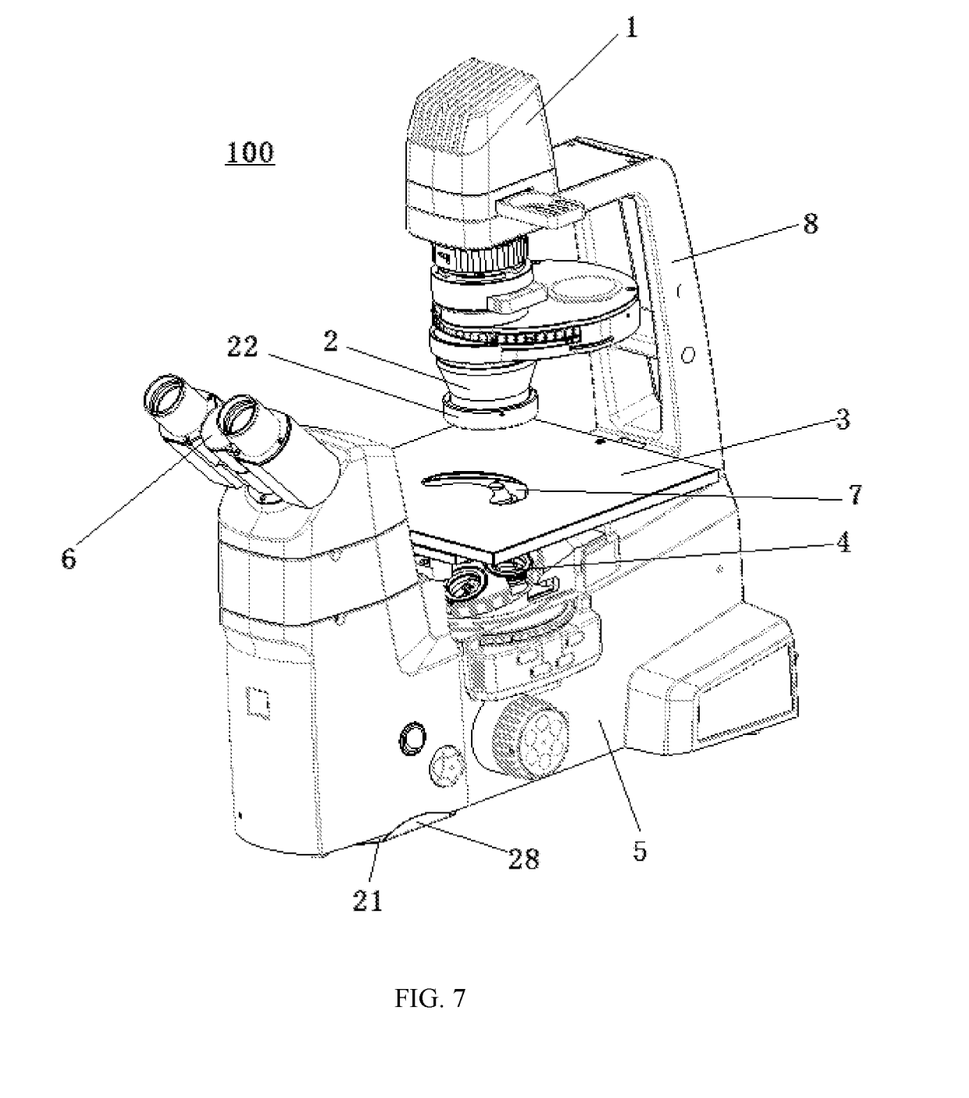
FIG. 7 is a perspective view of another exemplary configuration of a microscope according to the invention.

According to the configurations of the light shielding devices 20 shown in FIGS. 2 to 5, a simple light shield 21 can be conveniently mounted to the lower end portion of the condenser 2 in the fluorescence observation mode to effectively block ambient light; and when fluorescence observation is not performed, the light shield 21 can be quickly and easily removed manually, which simplifies the structure of the light shielding device and improves the convenience of use. As shown in FIG. 7, the light shield 21 removed from the condenser 2 may be placed, for example, in a recess (not shown) provided on the bottom surface of the base 5 of the microscope 100 in order not to be lost. The bending portion 28 provided on the light shield 21 helps to pull the light shield 21 from the recess and mount it onto the condenser 2 again.

The embodiments disclosed above are merely examples of the invention, and all obvious modifications and variations made by those skilled in the art should be considered as falling within the scope of the invention.

What is claimed is:

1. A light shielding device for a microscope, the microscope comprising a condenser configured so that transmitting illumination light from a transmitting illumination light source is irradiated from above a stage to a specimen on the stage via the condenser,
   wherein fluorescent illumination light is irradiated from below the stage to the specimen on the stage,
   wherein the light shielding device is mounted to a lower end portion of the condenser to at least partially block ambient light entering an objective of the microscope,
   wherein the light shielding device comprises a light shield and a mounting mechanism configured to mount the light shield below the lower end portion of the condenser in a manually removable manner,
   wherein the light shield comprises a through hole and a light shielding portion surrounding the through hole, the through hole is configured to allow all or part of the transmitting illumination light from the condenser to pass through the light shield,
   wherein a light shield filter is provided at the through hole, the light shield filter is a neutral density filter, and
   wherein the neutral density filter attenuates light of different wavelengths passing therethrough in the same proportion/ratio.

2. The light shielding device according to claim 1, wherein
   the mounting mechanism comprises a collar mounted around or integrally formed with the lower end portion of the condenser, wherein one or more magnets are fixed on a lower end surface of the collar, and wherein the light shield contains a ferromagnetic material and is attached to the collar by a magnetic attractive force between the magnet(s) and the ferromagnetic material.

3. The light shielding device according to claim 2, wherein
   a depression is provided in an upper surface of the light shield wherein the light shield is attached to the collar, a lower end portion of the collar is received in the depression to define a position of the light shield relative to the collar.

4. The light shielding device according to claim 1, wherein
   the mounting mechanism comprises a collar mounted around or integrally formed with the lower end portion of the condenser, wherein one of a lower end portion of the collar and an upper surface of the light shield is provided with a slot, wherein and the other of the lower end portion of the collar and the upper surface of the light shield is provided with a flange fitted in the slot, or
   the mounting mechanism comprises a collar mounted around or integrally formed with the lower end portion of the condenser, wherein a circular boss is provided on an upper surface of the light shield, wherein one of a lower end portion of the collar and the circular boss is formed with a plurality of radially protruding protrusions arranged circumferentially at intervals, wherein the other of the lower end portion of the collar and the circular boss is formed with a plurality of L-shaped grooves corresponding to the plurality of protrusions, and wherein the plurality of protrusions are respectively received in the plurality of L-shaped grooves to form a bayonet connection between the collar and the circular boss, or
   the mounting mechanism comprises at least two clamping members resiliently biased toward each other to clamp the lower end portion of the condenser, and wherein the light shield is fixed to a lower end surface of one of the at least two clamping members.

5. The light shielding device according to claim 1, wherein
   the light shield filter has an average reflection of not more than 4% for light with a wavelength of 420 nm to 680 nm, an average transmission of not more than 2% for light with a wavelength of 350 nm to 400 nm, and an average transmission between 1.3% and 2% for light with a wavelength of 400 nm to 700 nm.

6. A microscope comprising:
   a condenser configured so that transmitting illumination light from a transmitting illumination light source is irradiated from above a stage to a specimen on the stage via the condenser, wherein fluorescent illumination light is irradiated from below the stage to the specimen on the stage; and
   a light shielding device according to claim 1.

7. The microscope according to claim 6, wherein
   a recess is provided on a bottom surface of a base of the microscope to receive the light shield removed from the condenser.

8. The microscope according to claim 6, wherein
   the microscope further comprises an illumination light path filter disposed in a light path between the transmitting illumination light source and the specimen on the stage.

9. The microscope according to claim 8, wherein
   the illumination light path filter is disposed at a light outlet of the transmitting illumination light source, or
   the illumination light path filter is any one of a neutral density filter, a color filter, a bandpass filter, a notch filter, a long pass filter, a spectral filter and a multivariate optical element that can tune transmission at different wavelengths, or
   the illumination light path filter has different transmissions for light of different wavelengths to match with emission spectral intensity of the transmitting illumination light source, wherein transmission of the illumination light path filter is inversely proportional to the emission spectral intensity of the transmitting illumination light source, and wherein transmission of the illumination light path filter is lower for a wavelength with a higher emission spectral intensity, and is higher for a wavelength with a lower emission spectral intensity, or the illumination light path filter has an average reflection of not more than 4% for light with a wavelength of 420 nm to 680 nm, an average transmission of not more than 2% for light with a wavelength of 350 nm to 400 nm, and an average transmission between 1.3% and 2% for light with a wavelength of 400 nm to 700 nm.

10. A light shielding device for a microscope in which transmitting illumination light from a transmitting illumination light source is irradiated from above a stage to a specimen on the stage and fluorescent illumination light is irradiated from below the stage to the specimen on the stage,
    wherein the light shielding device comprises a light shield disposed above the specimen on the stage to at least partially block ambient light entering an objective of the microscope,
    wherein the light shield comprises a through hole and a light shielding portion surrounding the through hole, the through hole is configured to allow all or part of the transmitting illumination light to pass through the light shield, and a light shield filter is provided at the through hole, wherein the light shield filter is a neutral density filter, and
    wherein the neutral density filter attenuates light of different wavelengths passing therethrough in the same proportion/ratio.

11. The light shielding device according to claim 10, wherein
    the light shield filter has an average reflection of not more than 4% for light with a wavelength of 420 nm to 680 nm, an average transmission of not more than 2% for light with a wavelength of 350 nm to 400 nm, and an average transmission between 1.3% and 2% for light with a wavelength of 400 nm to 700 nm.

12. The light shielding device according to claim 10, wherein
    the microscope comprises a condenser configured so that the transmitting illumination light from the transmitting illumination light source is irradiated from above the stage to the specimen on the stage via the condenser, the light shielding device is mounted to a lower end portion of the condenser and further comprises a mounting mechanism configured to mount the light shield below the lower end portion of the condenser in a manually removable manner.

13. The light shielding device according to claim 12, wherein
    the mounting mechanism comprises a collar mounted around or integrally formed with the lower end portion of the condenser, wherein one or more magnets are fixed on a lower end surface of the collar, and wherein the light shield contains a ferromagnetic material and is attached to the collar by a magnetic attractive force between the magnet(s) and the ferromagnetic material.

14. The light shielding device according to claim 13, wherein
    a depression is provided in an upper surface of the light shield wherein the light shield is attached to the collar, a lower end portion of the collar is received in the depression to define a position of the light shield relative to the collar.

15. A microscope, in which transmitting illumination light from a transmitting illumination light source is irradiated from above a stage to a specimen on the stage and fluorescent illumination light is irradiated from below the stage to the specimen on the stage, and which comprises a light shielding device according to claim 10.

16. A microscope, in which transmitting illumination light from a transmitting illumination light source is irradiated from above a stage to a specimen on the stage and fluorescent illumination light is irradiated from below the stage to the specimen on the stage, and which comprises:
    a light shielding device disposed above and the specimen on the stage to at least partially block ambient light entering an objective of the microscope;
    an illumination light path filter disposed in a light path between the transmitting illumination light source and the specimen on the stage, wherein the illumination light path filter is a neutral density filter, and
    wherein the neutral density filter attenuates light of different wavelengths passing therethrough in the same proportion/ratio.

17. The microscope according to claim 16, wherein
    the illumination light path filter is disposed at a light outlet of the transmitting illumination light source, or
    the illumination light path filter has an average reflection of not more than 4% for light with a wavelength of 420 nm to 680 nm, an average transmission of not more than 2% for light with a wavelength of 350 nm to 400 nm, and an average transmission between 1.3% and 2% for light with a wavelength of 400 nm to 700 nm.

18. The microscope according to claim 16, wherein
    the microscope further comprises a condenser configured so that the transmitting illumination light from the transmitting illumination light source is irradiated from above the stage to the specimen on the stage via the condenser, the light shielding device is mounted to a lower end portion of the condenser and comprises a light shield and a mounting mechanism configured to mount the light shield below the lower end portion of the condenser in a manually removable manner.

19. The microscope according to claim 18, wherein
    the mounting mechanism comprises a collar mounted around or integrally formed with the lower end portion of the condenser, wherein one or more magnets are fixed on a lower end surface of the collar, and wherein the light shield contains a ferromagnetic material and is attached to the collar by a magnetic attractive force between the magnet(s) and the ferromagnetic material.

20. The microscope according to claim 19, wherein
    a depression is provided in an upper surface of the light shield wherein the light shield is attached to the collar, a lower end portion of the collar is received in the depression to define a position of the light shield relative to the collar.

21. The microscope according to claim 18, wherein
    the mounting mechanism comprises a collar mounted around or integrally formed with the lower end portion of the condenser, wherein one of a lower end portion of the collar and an upper surface of the light shield is provided with a slot, and wherein the other of the lower end portion of the collar and the upper surface of the light shield is provided with a flange fitted in the slot, or the mounting mechanism comprises a collar mounted around or integrally formed with the lower end portion of the condenser, wherein a circular boss is provided on an upper surface of the light shield, wherein one of a lower end portion of the collar and the circular boss is formed with a plurality of radially protruding protrusions arranged circumferentially at intervals, wherein the other of the lower end portion of the collar and the circular boss is formed with a plurality of L-shaped grooves corresponding to the plurality of protrusions, and wherein the plurality of protrusions are respectively received in the plurality of L-shaped grooves to form a bayonet connection between the collar and the circular boss, or the mounting mechanism comprises at least two clamping members resiliently biased toward each other to clamp the lower end portion of the condenser, and the light shield is fixed to a lower end surface of one of the at least two clamping members, or the light shield comprises a through hole and a light shielding portion surrounding the through hole, the through hole is configured to allow all or part of the transmitting illumination light from the condenser to pass through the light shield, or a recess is provided on a bottom surface of a base of the microscope to receive the light shield removed from the condenser.

* * * * *